US007937091B2

(12) United States Patent
Roman et al.

(10) Patent No.: US 7,937,091 B2
(45) Date of Patent: May 3, 2011

(54) METHOD AND APPARATUS FOR RESOURCE SHARING OVER HANDSET TERMINALS

(75) Inventors: Manuel Roman, Sunnyvale, CA (US);
Nayeem Islam, Palo Alto, CA (US)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 10/873,825

(22) Filed: Jun. 21, 2004

(65) Prior Publication Data

US 2005/0054354 A1 Mar. 10, 2005

Related U.S. Application Data

(60) Provisional application No. 60/482,669, filed on Jun. 25, 2003.

(51) Int. Cl.
*H04W 72/00* (2009.01)
*H04W 68/00* (2009.01)

(52) U.S. Cl. ............ 455/454; 455/412.1; 455/459; 709/231; 709/203; 709/204; 709/205; 709/219; 709/246; 370/386

(58) Field of Classification Search .......... 455/454, 455/509, 450, 422.1, 464, 516–519; 370/329–341, 370/431–449
See application file for complete search history.

(56) References Cited

U.S. PATENT DOCUMENTS

| | | | |
|---|---|---|---|
| 6,578,081 B1 | 6/2003 | Tominaga et al. | |
| 7,003,284 B2 * | 2/2006 | Schwartz et al. | 455/414.1 |
| 7,353,252 B1 * | 4/2008 | Yang et al. | 709/204 |
| 7,401,152 B2 | 7/2008 | Traversat et al. | |
| 7,457,848 B2 * | 11/2008 | Kon | 709/217 |
| 7,533,141 B2 | 5/2009 | Nadgir et al. | |
| 7,584,285 B2 | 9/2009 | Hudson et al. | |
| 2002/0073220 A1 | 6/2002 | Lee | |
| 2002/0184318 A1 | 12/2002 | Pineau | |

FOREIGN PATENT DOCUMENTS

JP 2002175234 6/2002

OTHER PUBLICATIONS

Fox, Armando et al., "Adapting to Network and Client Variability via On-Demand Dynamic Distillation," University of California at Berkeley (11 pages).
Park, Joon S. et al., "Role-Based Access Control on the Web," ACM Transactions on Information and System Security, vol. 4, No. 1, Feb. 2001, pp. 37-71.
Krishna Kant et al., "A Framework for Classifying Peer-to-Peer Technologies," Proceedings of the 2nd IEEE/ACM International Symposium on Cluster Computing and the Grid, May 21-24, 2002, pp. 1-8, IEEE, Berlin, Germany.
PCT International Search Report, Dec. 9, 2004, 4 pages.
Office Action dated Jul. 6, 2009 for related U.S. Appl. No. 11/601,126, filed Nov. 16, 2006, 8 pages.

(Continued)

*Primary Examiner* — Charles N Appiah
*Assistant Examiner* — Emem Stephen
(74) *Attorney, Agent, or Firm* — Blakey, Sokoloff, Taylor & Zafman LLP

(57) ABSTRACT

A mechanism and supporting apparatus to enable resource sharing among groups of users over mobile terminals. The system presented leverages the carrier infrastructure to simplify the requirements at the terminals, and describes a graphical user interface binding mechanism that allows developing generic graphical users interfaces that can be customized to heterogeneous devices at run-time.

48 Claims, 10 Drawing Sheets

OTHER PUBLICATIONS

US Office Action for U.S. Appl. No. 11/601,126, Jul. 6, 2009, 8 pgs.
US Final Office Action for U.S. Appl. No. 11/601,126, Jan. 15, 2010, 9 pgs.
US Office Action for U.S. Appl. No. 11/601,126, Sep. 24, 2010, 19 pgs.
PCT Written Opinion of the International Searching Authority, Jan. 12, 2006. 7 pages.
Japanese Office Action for corresponding Japanese Patent Application No. 2006-517629, May 28, 2010, 2 pgs.

* cited by examiner

METHOD AND APPARATUS FOR RESOURCE SHARING OVER HANDSET TERMINALS

PRIORITY

The present patent application claims priority to the corresponding provisional patent application Ser. No. 60/482,669, titled, "Method and Apparatus for Media Sharing Over Handset Terminals" filed on Jun. 25, 2003.

FIELD OF THE INVENTION

The present invention relates to the field of mobile communication; more particularly, the present invention relates to resource sharing over mobile devices.

BACKGROUND OF THE INVENTION

The future success of the wireless web will be dominated by the dissemination of personal content. Personal content refers to herein content created in real-time by individuals and that is of personal nature. A primitive form of personal content creation and dissemination exists today based on cellular phones equipped with cameras and carriers supporting multimedia messaging, or MMS. This type of content dissemination is primitive because it only allows point-to-point media distribution—i.e., the user takes a picture and sends it directly to another user. However, the wired web has created an ecosystem for content creation and dissemination that is very sophisticated, but highly targeted towards corporations and businesses. The wireless web will evolve to enable a similar ecosystem for personal content creation. However, this vision requires a supporting infrastructure capable of addressing the associated challenges, including group management, media distribution, and dynamic graphical user interface mapping for heterogeneous devices.

The Internet has become the fastest adopted mass media mechanism in history ahead of even radio and TV. One of the keys to this success is the sharing model that allows any user to publish information that can be accessed worldwide. Furthermore, the grouping of data into pages and the use of hyperlinks to define data connection graphs provide an elegant yet simple mechanism to associate distributed sets of data. The Internet sharing model can be divided into four processes: media generation, media organization, media visibility, and media access. The first three processes are related to the media publisher, while the last one is related to the end user, or the media viewer. Media generation involves gathering data that the publisher wants to export. This data includes captured media such as audio, video and pictures, and generated media including documents, annotations and records from databases. Media organization is related to the logical structuring of the media and how it will be presented to the users. Media visibility defines policies to control the data accessible to different users. Finally, media access is the process by which users (media viewers) access the published data.

The four processes denoted in the paragraph above are generic and can be mapped to different domains. With Wired Web, the traditional World Wide Web model is characterized by servers connected to the Internet via wired connections and hosting commercial and personal websites. Wireless web denotes a sharing model refers to Personalized Group Wide Web that assumes collections of personal handheld devices wirelessly connected and hosting personal information that can be shared directly from the device with groups of users. Both models differ in terms of media generation, organization, visibility, and access. In this paper, we emphasize the differences, explain the challenges associated to the Wireless Web model, and present a software infrastructure that accommodates these challenges.

Yahoo Groups allows people to exchange messages, pictures, and calendar and database entries. See Yahoo Groups, http://groups.yahoo.com. However, this model is not customized for handheld users that would be required to upload all the media from their handsets to the central server. Instead, the PGWW model is based on the assumption that media is exported directly from the handsets and can be automatically migrated based on a number of properties.

Blogging is a combination of a diary and guide site that allows people to publish media and links in real-time to a website. See Blogger.com, http://www.blogger.com. However, blogging has no concept of group, once a person logs into the website, the media he or she generates will be visible to everyone. Furthermore, blogging assumes a connection to a central server that hosts the blog. Handset users do not have tools that allow them to leverage their devices by pre-processing some of the data. Furthermore, there is no mechanism to notify users about new media posted in the blog. As a result, users must periodically check for new additions.

Instant messaging allows users to exchange messages in real-time and it is widely used worldwide. For more information, see AOL Instant Messenger, http://www.aim.com/index.adp and Microsoft Messenger, http://messenger.msn.com/. With the advent of smart phones instant messaging programs have been ported to these devices, therefore allowing users to exchange messages at anytime. Although the middleware infrastructure for personalized group wide web (i.e., sharing of personal content with groups of people) can be extended to support instant messaging, the original approach is intended to allow users to post media that can be accessed by interested parties.

There are two standard mechanisms to share resources among mobile terminals. One of them assumes a client-server approach where all the functionality and the resources are at the server side. Clients push and obtain resources to and from the server. The second approach assumes that there is no server infrastructure. As a result, the sharing infrastructure is partitioned among the handsets following a peer-to-peer approach.

SUMMARY OF THE INVENTION

A method and apparatus is disclosed herein for enabling resource sharing among groups of users over mobile terminals. In one embodiment, the apparatus comprises a mobile device for use with a network device of a carrier as one of the multiple mobile devices. The mobile device includes a memory to store one or more media resources and a resource manager to control the one or more media resources stored in the memory by cooperating with a resource coordinator of the carrier to dynamically determine whether a media resource or a link to the media resource is to be provided to the resource coordinator to enable distribution of the one or more media resources to other mobile devices of the group of mobile devices.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
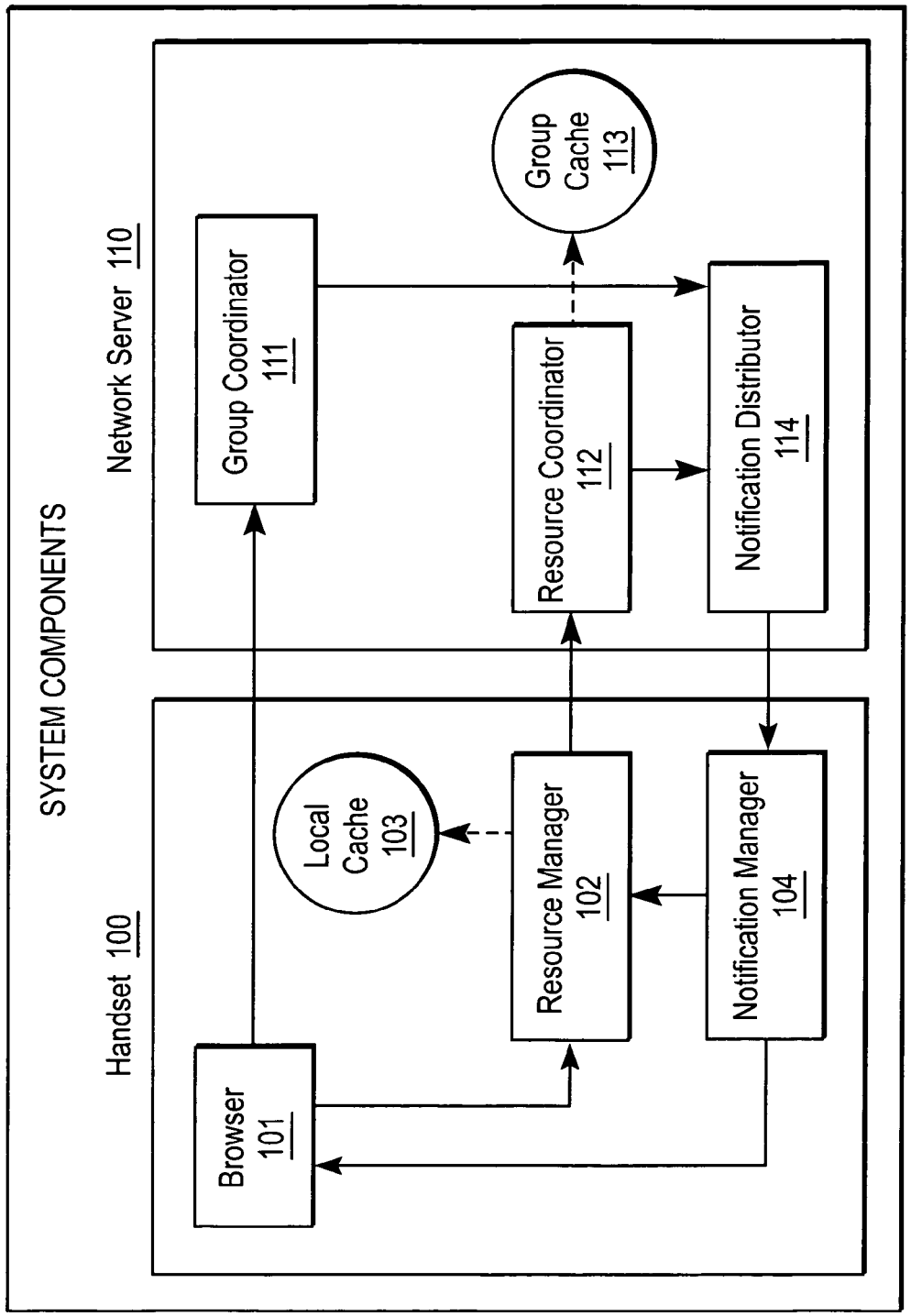
FIG. 1A illustrates the system components to perform the efficient resource sharing.

The techniques described herein are based on an intermediate approach between the two standard mechanisms to share resources among mobile devices (e.g., handsets, terminals, etc.). More specifically, a server infrastructure coordinates the group and assumes that mobile devices can participate in the group management protocol, and resources are shared directly from the mobile devices. According to this approach, the server coordinates group management requests and implements a bi-directional protocol to maintain the mobile devices up-to-date. This leverages the client-server model. In one embodiment, mobile terminals participate in the protocol and therefore do not require contacting the server-side infrastructure for every single request; the protocol allows them to keep up-to-date information in their own memory. Unlike a pure client-server approach, this model relies on sharing resources directly from the mobile devices. As a result, mobile terminals provide a service to export local resources and accept requests from remote devices.

The hybrid model presented herein, can handle disconnections and failures at the mobile terminal side easily. When the mobile device detects it has been disconnected or it has crashed, it can connect to the group coordinator of the server (described below) and obtain the most up-to-date group information. This information allows the mobile device to synchronize with the rest of the members of the group.

The following description presents a mechanism and supporting apparatus to enable dynamic media sharing among groups of handsets. Techniques described herein also provide for dynamic and adaptive resource posting and distribution, including a mechanism for efficient handset resource hosting.

In one embodiment, the handset resource hosting performed is according to a dynamic protocol by which handsets hand over resources to a network server of a carrier whenever the condition, or threshold, is reached. Such conditions of the handset may include, for example, an excessive bandwidth consumption condition, a low battery condition, or a storage quota condition. When in an excessive bandwidth consumption condition, the handset may not want to provide media resources to other handsets to avoid using too much bandwidth. The low battery condition is one in which a handset hosting a resource may wish to enter a low power state to conserve battery power and not have to maintain power to continue to respond to resource requests for resources it is hosting. The storage quota condition refers to a condition in which the handset has a limited capacity (in number or size) to host resources and, when reaching its limit, the handset provides resources to the network to host on its behalf.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1A illustrates the system components to perform the efficient resource sharing described herein. Referring to FIG. 1A, handset 100 is shown communicably coupled to network server 110 of a carrier. Handset 100 is part of a group of handsets that is handled by the carrier. Handset 100 may be any mobile device (e.g., a cellular phone, computer system, etc.). Network server 110 of the carrier may comprise one or more of these servers to coordinate the resource sharing performed the carrier in cooperation with the handsets in the group (and other groups of handsets). Note that the network server 110 may coordinate resources for multiple groups of handsets. A group is composed of one or more members and zero or more resources, which are provided by the members. In one embodiment, a group includes at least one member but it is possible to have groups that do not contain resources. Each resource belongs to exactly one member, and each member can export zero or more resources to the group. A resource is defined herein as a base class, a subclass of which is referred to herein as media. A member is a base class, from which a person may be a subclass. New subclasses for a resource and a member will allow extensions such as the incorporation of new types of resources (e.g., services) and members (e.g., ubiquitous computing environments).

In one embodiment, handset 100 includes a browser 101, resource manager 102, local cache 103, and notification manager 104. Resource manager 102 serves resources to other handsets and keeps track of resources added by other group member handsets. Notification manager 104 receives external notifications regarding resources and diverts them to the proper location for handling. Browser 101 indicates requests to add resources to the set of resources available to the handset group, retrieve resources, and to have lists of resources provided by resource manager 102.

Network server 110 includes a group coordinator 111, a resource coordinator 112, a group cache memory 113, and a notification distributor 114. Group coordinator 111 handles handset group coordination, including managing handset group membership. Resource coordinator 102 coordinates resource distribution and management for the handset group. Notification distributor 114 enables delivering of notifications regarding resources and their distribution and availability.

Referring to FIG. 1A, browser 101 or another application program of handset 100 sends requests to resource manager 102, which services these requests. These requests may include an add resource request, a retrieve resource request, and a list resources request. In response to an add resource request, the resource manager 102 requests the resource that handset 100 is hosting to be added to the group of resources available to handset group numbers. The request is made to resource coordinator 112, which store the resource into cache memory 113 and/or sends the resource to other handsets in the group. In response to a retrieve resource request, resource manager 102 requests the resource from resource coordinator 112, which provides the resource from group cache memory 113 or requests the resource from another handset in the group if the other handset is hosting the resource. Once the resource has been obtained, resource manager 102 causes the resource to be stored in local cache memory 103. In response to a list resources request, resource manager 102 provides browser 101 or another application process with a list of resources stored in local cache memory 103.

Overall Protocol

In one embodiment, the dynamic and adaptive media processing and distribution provide for dynamically handing over resources between handsets and carriers. In one embodiment, the dynamic and adaptive media hosting and distribution utilizes a protocol that switches between four media hosting and distribution techniques based on a set of criteria. In one embodiment, the criteria includes the popularity of the media as well as how much bandwidth is consumed by the media. In one embodiment, a component monitors network usage and the number of requests for the media. The component may use an adaptive threshold to determine a level of popularity.

In one embodiment, there are four media hosting and distribution types. These are referred to as link posting/link distribution, link posting/content distribution, content posting/link distribution, content posting/content distribution. In one embodiment, if the media popularity is high and the bandwidth available is high, the dynamic and adaptive media posting distribution model user content posting/content distribution made. If the popularity is medium and the bandwidth available medium, the dynamic and adaptive media posting distribution model switches to a mode of content posting and link distribution. If the media popularity is low and the bandwidth available is low, the dynamic and adaptive media posting and distribution model is switched to a link posting and link distribution mode. Lastly, if the media popularity is low, but the bandwidth available is high, the dynamic and adaptive media posting and distribution model switches to a link posting and content distribution mode. Note that high and low may be relative to each other. Each of the models will be disclosed in more detail below.

The infrastructure discussed above enables media sharing among handsets, by partitioning the middleware infrastructure between the carriers' network and the handsets. The infrastructure includes a number of protocols for group creation and deletion, membership management, and notification, which are used to support the sharing of resources. In one embodiment, the protocol for dynamically handing over resources between the handsets and the carriers is mainly coordinated by the resource manager of the handset and the resource coordinator of the server device of the carrier.

Add Resource Protocol

This protocol allows handset users to select local resources and make them available to the rest of the group of handsets. The exported resources are kept in the handsets instead of being transferred to the central server. As a result, handsets are also responsible for serving requests for the shared media.

In one embodiment, the protocol is initiated by a handset user willing to share media from his or her handset. Using an application running on the handset, the user selects a resource and sends a request to share it with the group. The resource manager running at the handset sends a request to the group object hosted at the carrier and provides the URL of the resource being shared. The group object uses the previously created notification channel to send a notification to all registered handsets. In one embodiment, the notification includes a message type "ResourceAdded" and the URL of the resource. The notification channel forwards the notification to the notification managers of the registered handsets. The notification includes the original parameters provided by the group, as well as two new fields: the type and the name of the channel. The notification manager receives the notification and forwards it to all listeners registered with the specific channel and running on the handset.

Figure 2:
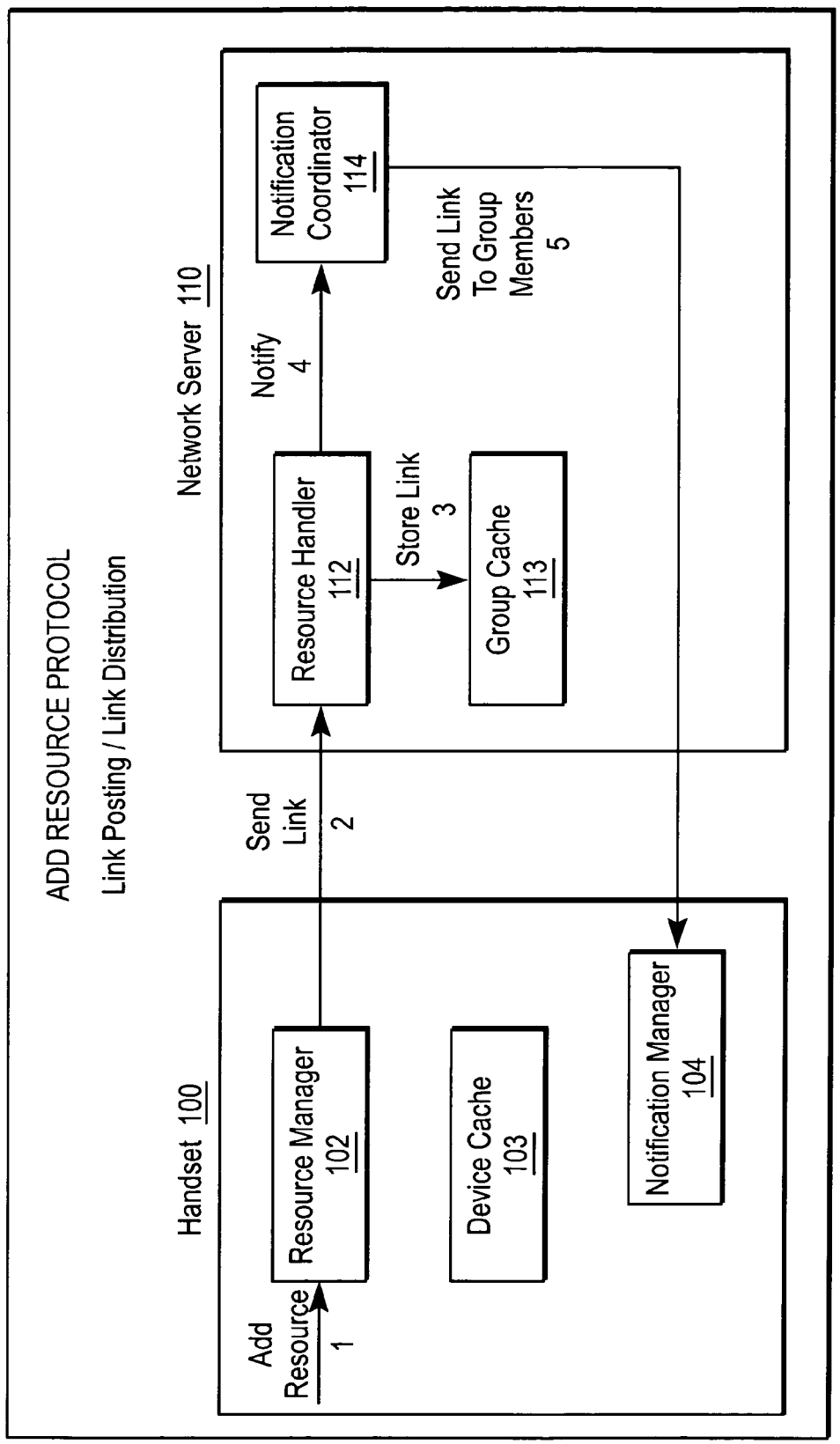
FIG. 2 illustrates a data flow diagram illustrating the link posting and link distribution mode between the handset and the network server of a carrier

FIG. 2 is a data flow diagram illustrating the link posting and link distribution mode between the handset and the network server of a carrier. Each of the operations will be described as performed by processing logic in the handset and the network server that may comprise hardware (e.g., circuitry, dedicated logic, etc.), software (such as is run on a general purpose computer system or a dedicated machine), or a combination of both.

Referring to FIG. 2, processing logic of resource manager 102 receives a request to add a resource to the pool of resources that are available to the handsets in the group coordinated by the carrier. The request may come from browser 101 or another application of handset 100. In response to the add resource request, the processing logic of resource manager 102 sends a link to resource coordinator 112 of network server 110. Processing logic of resource handler 112 receives the link and stores the link in group cache memory 113. Processing logic of resource handler 112 also sends a notification to notification coordinator 114. In response to receiving notification, processing logic of notification coordinator 114 sends the link to other handsets that are members of the group. Processing logic of notification managers in the handsets, such as notification manager 104, receive and store the link.

Figure 3:
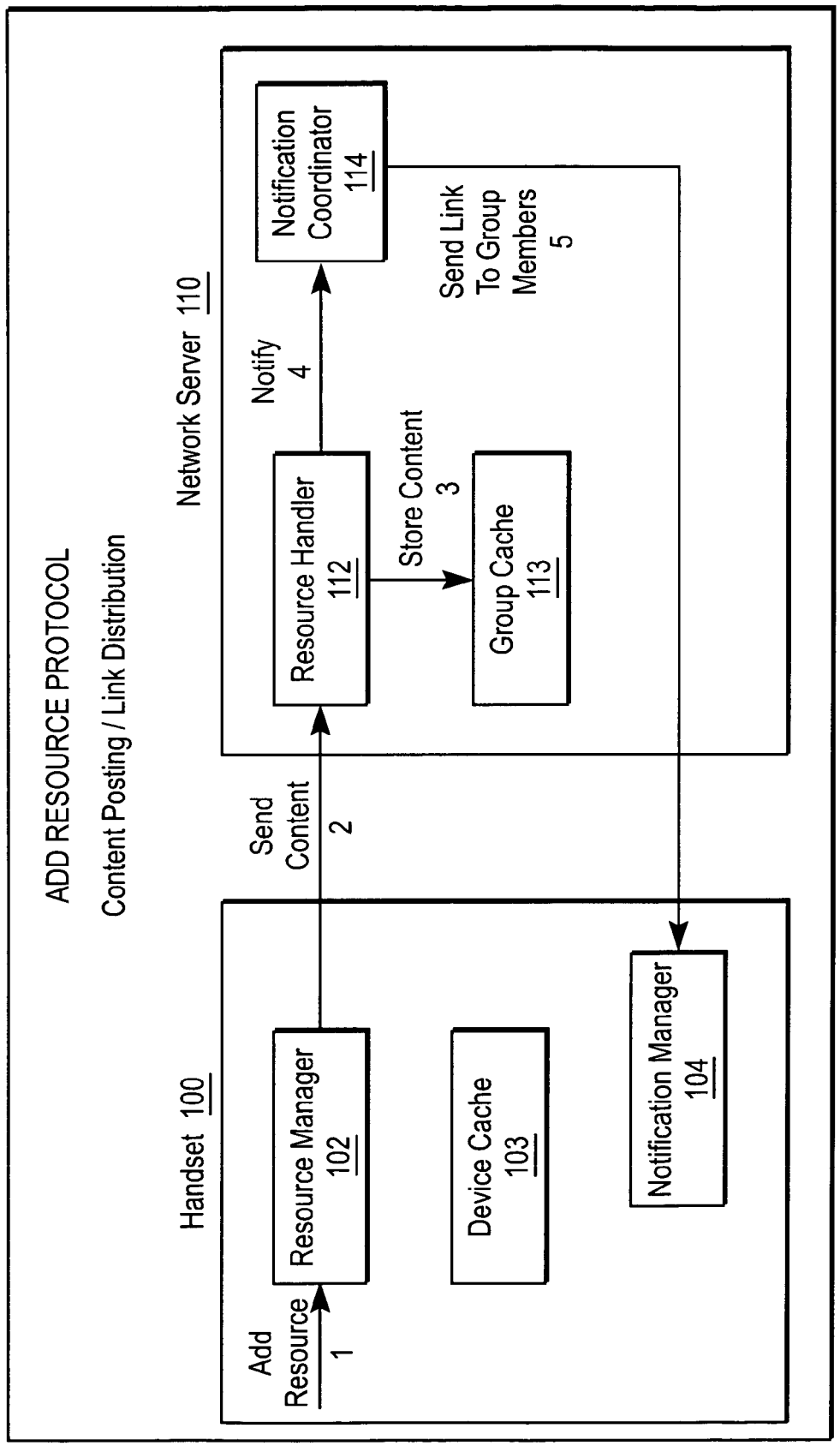
FIG. 3 illustrates a data flow design illustrating the content posting and link distribution mode to add a resource to the resources that are available to handsets in the group.

FIG. 3 is a data flow design illustrating the content posting and link distribution mode to add a resource to the resources that are available to handsets in the group. The operations are performed by processing logic in the handset and the network server that may comprise hardware (e.g., circuitry, dedicated logic, etc.), software (such as is run on a general purpose computer system or a dedicated machine), or a combination of both.

Referring to FIG. 3, the processing logic of resource manager 102 receives an add resource request. This add resource request may come from browser 101 or another application of handset 100. In response thereto, processing logic of resource manager 102 sends the content to resource handler 112. Processing logic of resource handler 112 receives the content from handset 100 and stores the content in group cache memory 113. Processing logic of resource handler 112 also sends a notification to notification coordinator 114. Processing logic of notification coordinator 114 receives the notification and sends a link to handsets in the group. Processing logic of the notification managers in the handsets, such as notification manager 104, receive the link from notification coordinator 114.

Figure 4:
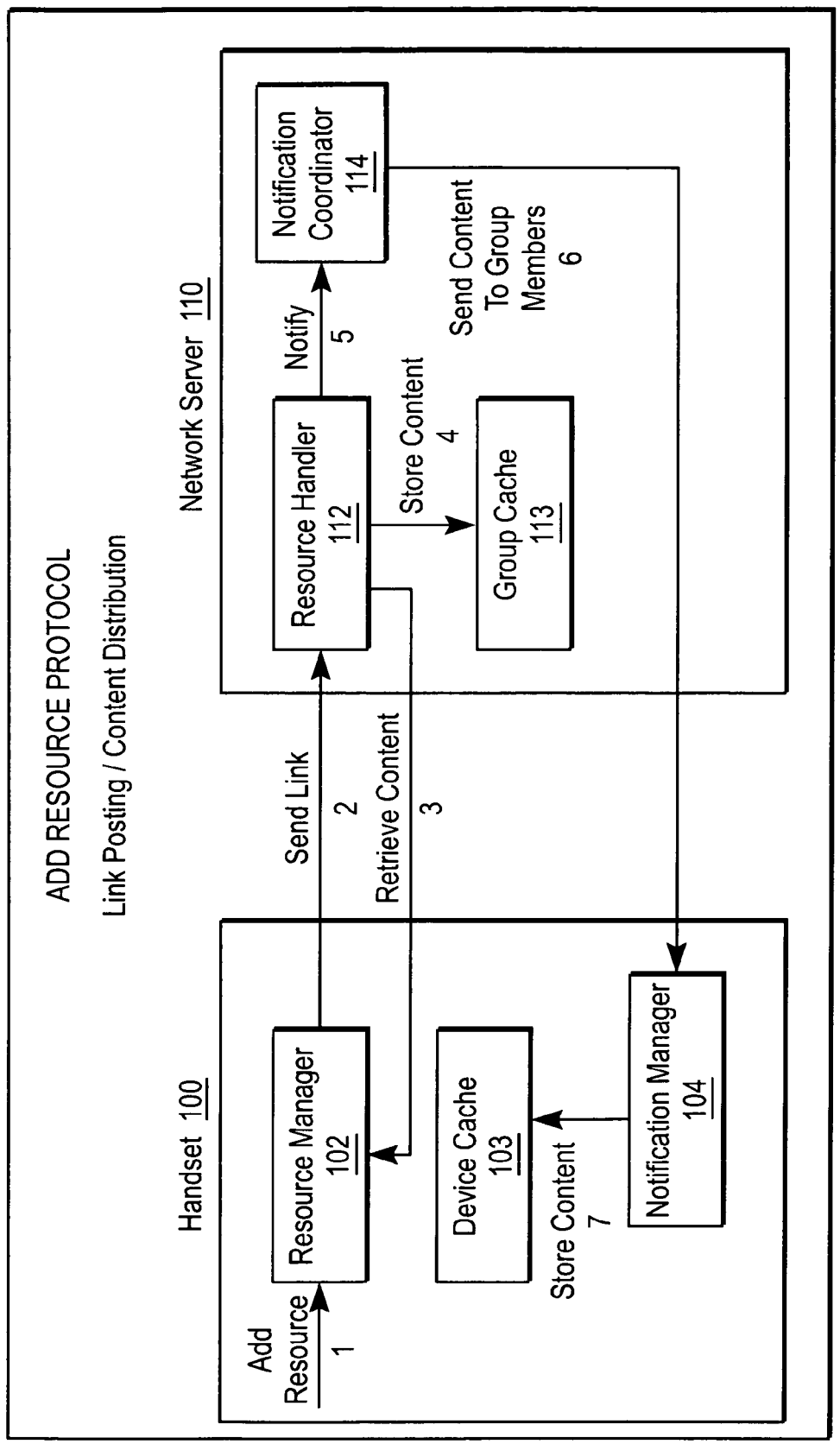
FIG. 4 illustrates a flow diagram illustrating one embodiment of the link posting and content distribution mode to add a resource to the resources available to handsets in the group.

FIG. 4 is a flow diagram illustrating one embodiment of the link posting and content distribution mode to add a resource to the resources available to handsets in the group. The operations in the link posting and content distribution mode are performed by processing logic in the handset and the network server of the carrier and comprise hardware (e.g., circuitry, dedicated logic, etc.), software (such as is run on a general purpose computer system or a dedicated machine), or a combination of both.

Referring to FIG. 4, processing logic of resource manager 102 receives an add resource request. The add resource request may be received from browser 101 or another application of handset 100. In response to receiving the add resource request, processing logic of resource manager 102 sends a link for the resource to resource handler 112. Processing logic of resource handler 112 receives the link and retrieves the content from resource manager 102. After receiving the content, processing logic of resource handler 112 stores the content in group cache memory 113. Processing logic of resource handler 112 also sends a notification to notification coordinator 114 indicating that a resource has been added to the resources that are available to the group of handsets. In response to the notification, processing logic of notification coordinator 114 receives these notifications and sends the content to handsets in the group. Processing logic of notification managers in the handsets, such as notification manager 104, receives the content and stores the content in the cache memory in the handset, such as cache memory 103.

Figure 5:
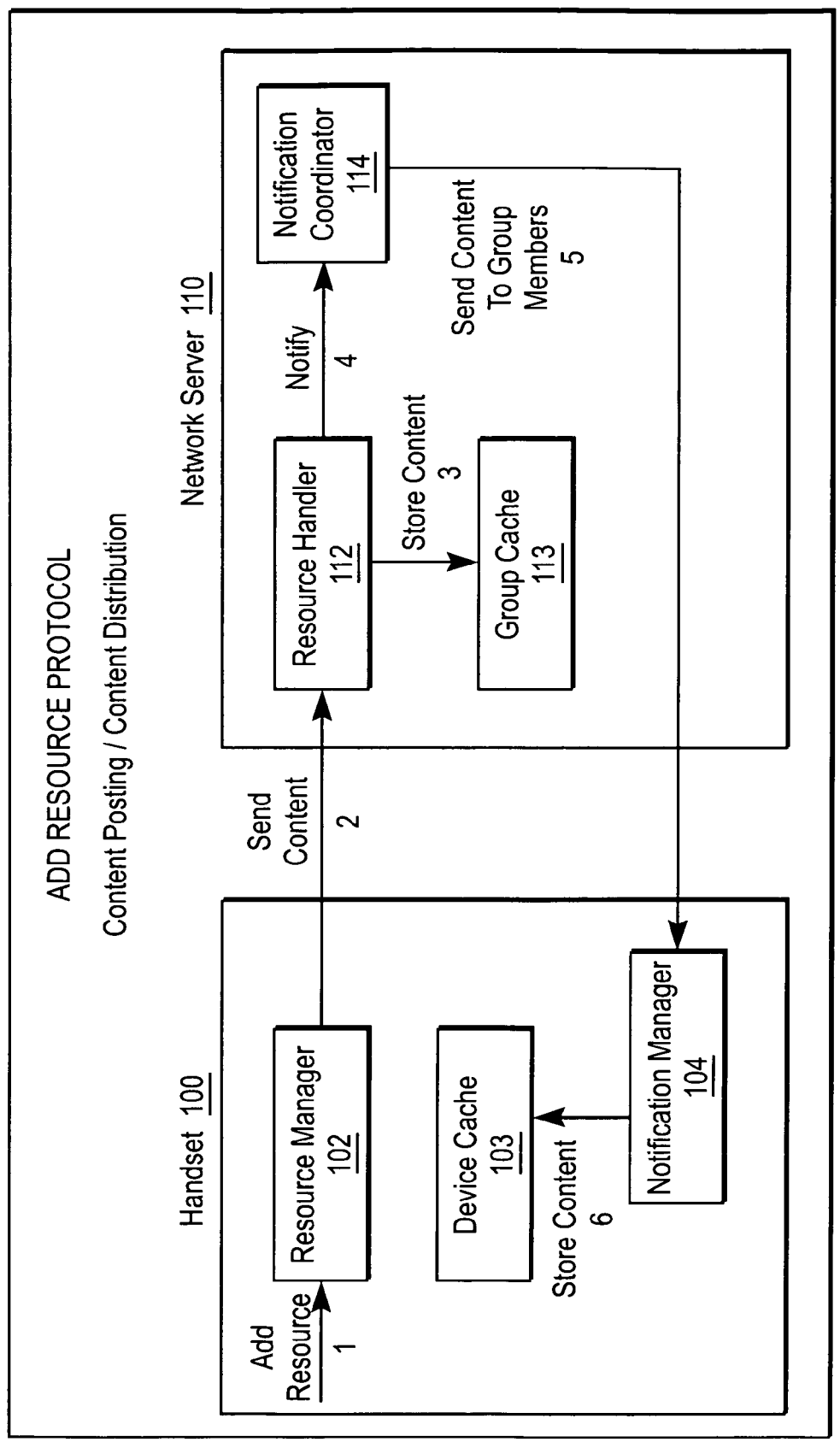
FIG. 5 illustrates a flow diagram of one embodiment of a process illustrating the content posting and content distribution mode for adding a resource to the set of resources that are available to the group of handsets.

FIG. 5 is a flow diagram of one embodiment of a process illustrating the content posting and content distribution mode for adding the resource to the set of resources that are available to the group of handsets. Operations in FIG. 5 are performed by processing logic of handset 100 and network server 110 of the carrier and may comprise hardware (e.g., circuitry, dedicated logic, etc.), software (such as is run on a general purpose computer system or a dedicated machine), or a combination of both.

Referring to FIG. 5, the process begins by processing logic of resource manager 102 receiving an add resource request. The add resource request may come from browser 101 or another application of handset 100. In response to the add resource request, processing logic of resource manager 102 sends the content to network server 110. Processing logic in resource handler 112 in network server 110 receives the content and stores the content in group cache memory 113. Processing logic in resource handler 112 also sends a notification to notification coordinator 114. Processing logic of notification coordinator 114 receives the notification and sends the content to handsets in the group. Processing logic of notification managers of the group of handsets, such as notification manager 104, receives the content and stores the content in memory, such as cache memory 103.

Resource Protocol for Obtaining Resources

The retrieve resource protocol implements efficient handset resource hosting and allows handset users to obtain resources added to the group. The difference is on the type of message sent by the group, and the method invoked by the listener adapter. The group object sends a message of type retrieve resource instead of resource added, and the listener adapter invokes ResourceRemoved instead of ResourceAdded, as is described in further detail below.

Figure 6:
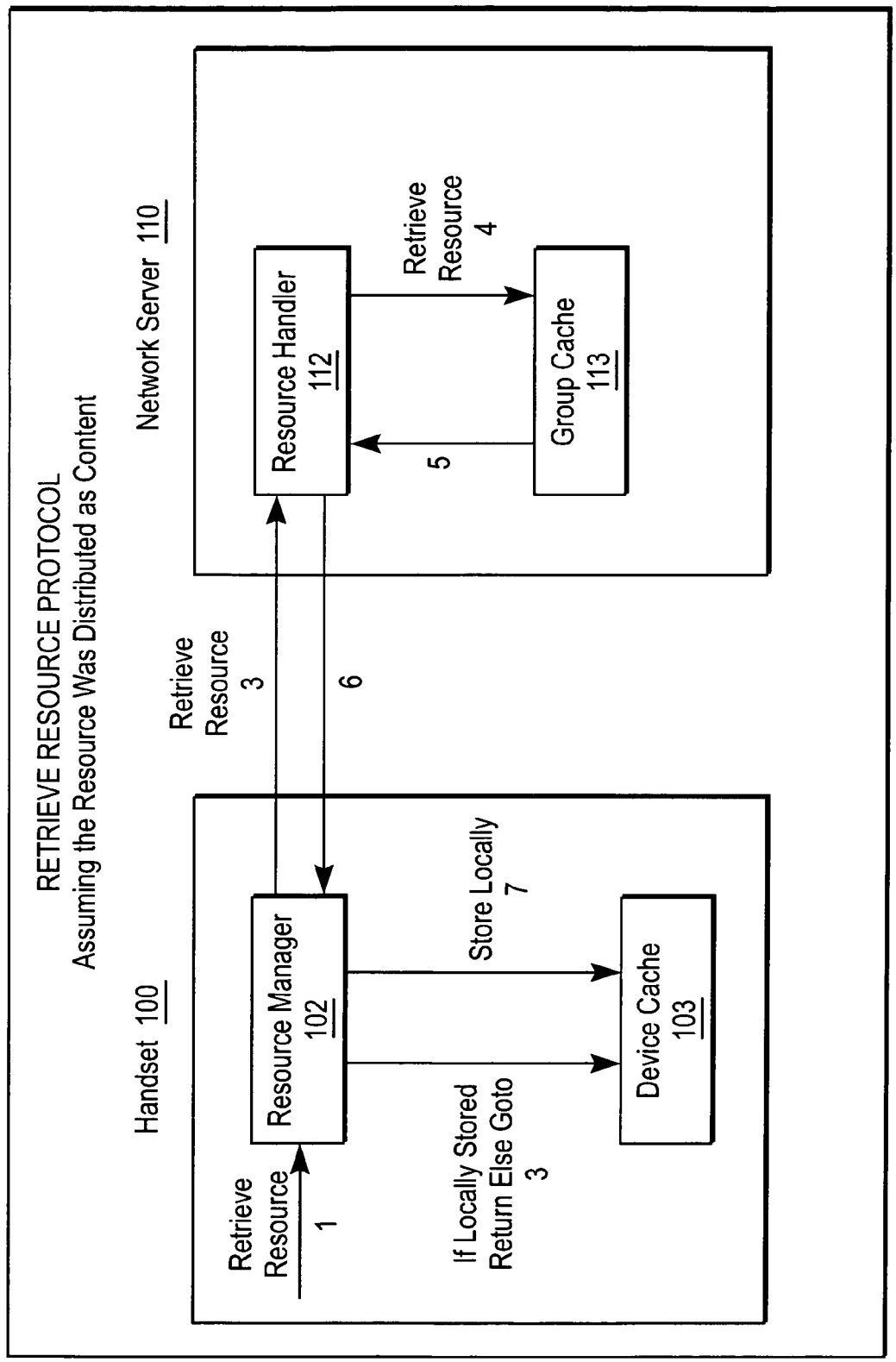
FIG. 6 illustrates a retrieve resource protocol from the content when the resource is distributed as content.
Figure 7:
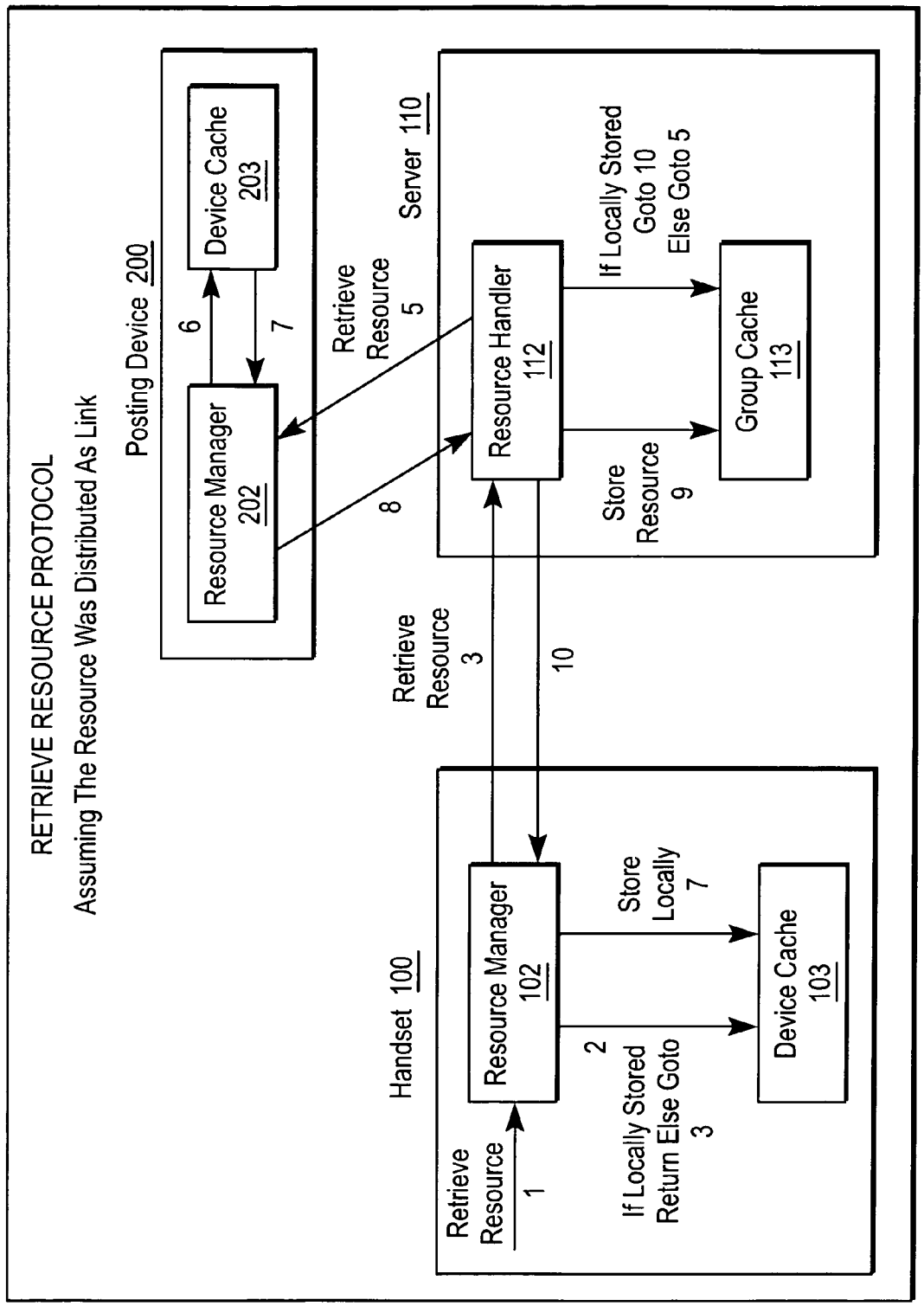
FIG. 7 illustrates the retrieve resource protocol for a resource distributed as a link.

FIGS. 6 and 7 illustrate data flow diagrams of two embodiments of retrieve resource protocols. FIG. 6 illustrates a retrieve resource protocol from the content when the resource is distributed as content, while FIG. 7 illustrates the retrieve resource protocol when the resource is distributed as a link.

Referring to FIG. 6, the operations in retrieving the resource are performed by processing logic in handouts and the network server and may comprise hardware (e.g., circuitry, dedicated logic, etc.), software (such as is run on a general purpose computer system or a dedicated machine), or a combination of both.

Referring to FIG. 6, processing logic of resource manager 102 receives a retrieve resource request from a browser 101 or another application of handset 100. In response to the request, resource manager 102 checks cache memory 103 to determine whether handset 100 has the resource cached locally. If it does, processing logic of resource manager 102 supplies the resource requested. If not, processing logic of resource manager 102 sends a retrieve resource request to network server 110 of the carrier. Processing logic of resource handler 112 receives the retrieve resource request and accesses cache memory 113 to retrieve the resource. In response, processing logic of resource handler 112 receives the resource and sends it to handset 100. Processing logic of the resource manager 102 receives the content from resource handler 112 and stores the content in cache memory 103. Processing logic of resource manager 102 also provides the resource to the requesting application.

FIG. 7 performs the resource retrieval similarly to that described in conjunction with FIG. 6. However, in response to processing logic of resource handler 112 receiving the retrieval request and determining that the local cache memory 113 does not contain the resource, processing logic of resource handler 112 sends a retrieve resource request to the handset posting the resource, to handset 200 in this case. Processing logic of resource manager 202 receives the request and accesses cache memory 203. Processing logic of the resource manager receives the content and sends the content to resource handler 112. Processing logic of resource handler 112 receives the content, stores the copy of the resource in cache memory 113 and forwards the content to handset 110. Processing logic of resource manager 102 receives the content and stores it in cache memory 103. Processing logic of resource manager 102 also provides the content to the application that requested the resource in the first place, such as browser 101 of handset 110

An Exemplary Implementation

Figure 1B:
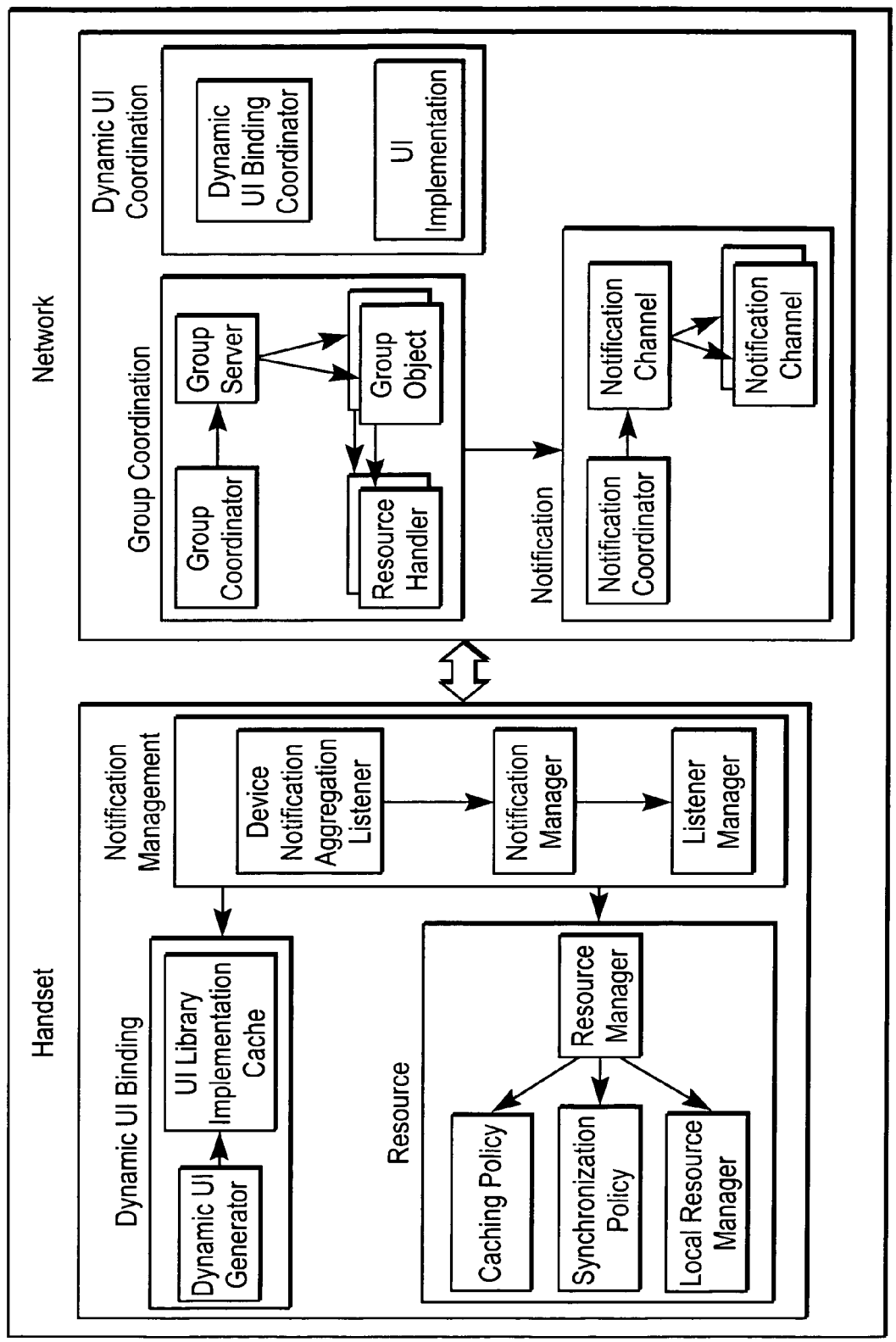
FIG. 1B illustrates an overall view of the system architecture.

FIG. 1B illustrates an overall view of the system architecture. This approach enables group media sharing based on an asymmetric client-server middleware infrastructure partitioned between the network and the handset. The middleware at the network provides functionality for group coordination, membership coordination, media coordination, notification coordination, and dynamic user interface (UI) binding coordination. The middleware infrastructure at the handset provides functionality to add and remove media to and from the group, functionality to receive notifications and route them to the appropriate services registered in the handset, and functionality to generate user interfaces customized for the device. Notifications inform handsets about group, membership, and media changes in the group.

Figure 8:
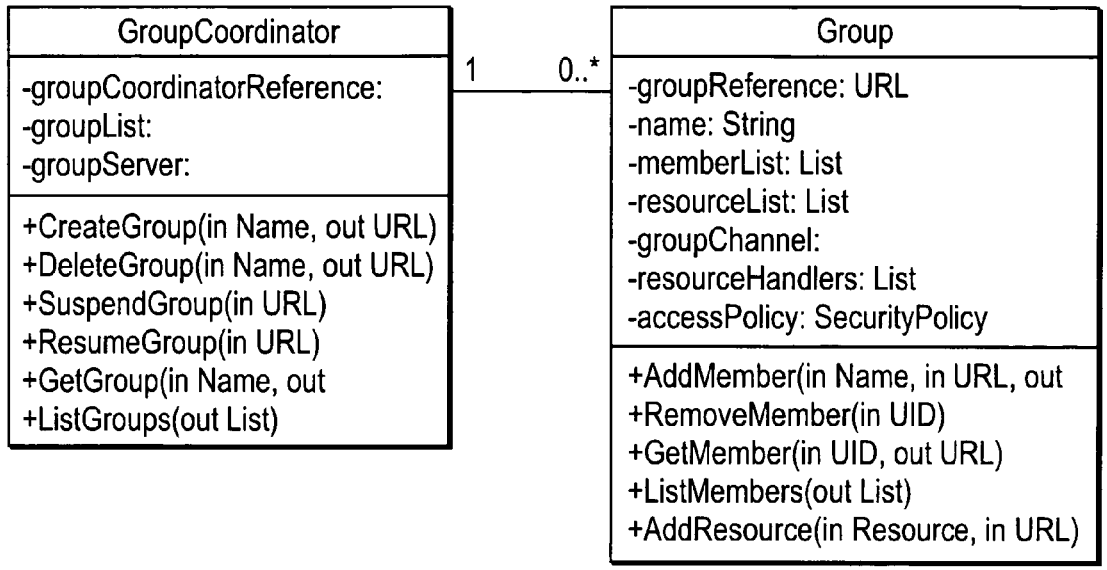
FIG. 8 illustrates a UML diagram of one embodiment of a group coordinator, including the interfaces for both objects.

In one embodiment, the group coordinator is a remotely accessible object responsible for overall group coordination, including group creation, deletion, suspension, and resumption. The group coordinator also manages group membership, but delegates the functionality to a remotely accessible object of class group. FIG. 8 is a UML diagram of one embodiment of a group coordinator, including the interfaces for both objects.

In one embodiment, every group defines a security domain that implicitly specifies who can publish and access media. The specifics of the security behavior of each group are encapsulated in a policy (access policy), which can be customized to different groups and contexts. Groups are also remote objects, which are registered with the group server instantiated by the group coordinator. In one embodiment, every group has an associated remote reference that allows peers (handsets) to communicate with it. A group object provides basic functionality to add, remove, list, and get members and resource. Furthermore, in one embodiment, group objects interact with two other specific objects: notification channel and resource handler. The media-sharing model sends notifications to clients, to keep them updated as the state of their group changes. Each time a method in the group object is invoked, the object automatically uses the notification channel to notify all members. The second object, the resource handler, is registered with the group object and receives notifications each time members and resources are added and removed to and from the group. A goal of the resource handler is to provide a reliable centralized service with access to the overall group activity. The resource handler can store the notifications sent in the group, which can be used by clients (handsets) to synchronize their state after periods of disconnection. Since resource handlers can be used for a large number of group specific tasks, an abstract class is provided that can be subclassed to provide specific functionality. For example, it is possible to create a DigestMediaHandler that generates a summary of all the media exported to the group in the form of a WEB/WAP/cHTML/XML page. This page contains links to the media added to the group, and stored in the client devices. This DigestMediaHandler allows clients not willing to participate in the notification mechanism to easily access all media exported to the group. Furthermore, different companies can customize the layout of the digest using existing company templates and authoring tools, to provide groups a customized visual aspect. Another resource handler example could automatically cache the media locally in the network, therefore allowing access to it, even when the handset exporting the media is not available. The default behavior of group sharing is to leave the media in the handsets. The generality of resource handlers provides a processing element with access to the overall state of the group. It is comparable to CGI in the traditional World Wide Web model.

Figure 9:
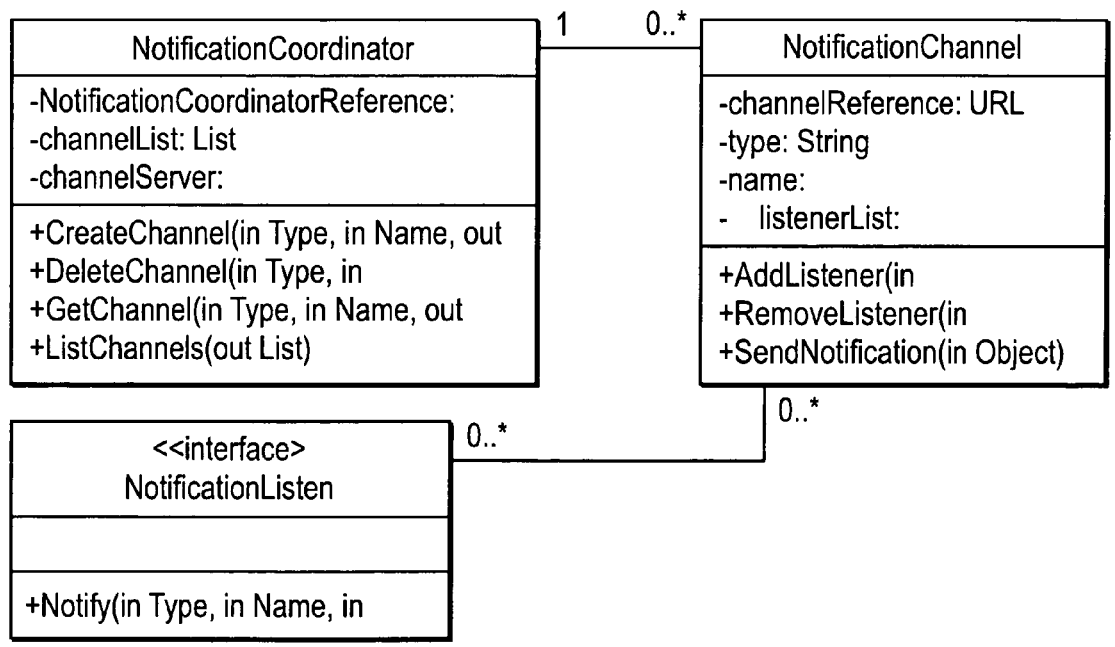
FIG. 9 illustrates a UML class diagram for one embodiment of a notification coordinator, notification channel and notification listener.

The notification coordinator (NC) provides functionality to enable the delivery of notifications among distributed objects. In one embodiment, the NC delegates the delivery functionality to an object referred to herein as a notification channel, and provides an interface to create, delete, list, and obtain notification channels. In one embodiment, groups are composed of members with different network connections, and therefore, different communication properties. The notification channel class can be subclassed to provide an implementation capable of providing different delivery semantics to ensure consistency regardless of the type of link the client is using. In one embodiment, every notification channel is characterized by a type and a name, and has a list of listeners. Furthermore, notification channels are implemented as remote objects. In on embodiment, there are three basic methods a notification channel implements: add listener, remove listener, and send notification. The default implementation of SendNotification iterates over the list of listeners and sends an asynchronous message to each listener that includes the type and name of the channel, and the parameter specified by the caller of the method. In one embodiment, all listeners implement the interface depicted in FIG. 9, which defines a method called Notify that is invoked by the notification channel. Listeners are also implemented as remote objects so they can be remotely invoked by the notification channel.

The goal of the Dynamic UI Binding Coordinator (DUIBC) is to assist the mobile device during the generation of the user interface. The DUIBC provides functionality to register specific UI Library Implementation, functionality to query for UI Library Implementations based on device capabilities, and functionality to upload the library implementation to the target device's dynamic UI binding manager. Furthermore, for devices with limited resources, the DUIBC can implement the UI binding process and send the customized interface to the mobile device. Note that for non-resource limited devices, the actual binding happens at the device.

The notification manager is responsible for receiving external notifications and redirecting them to the appropriate objects running in the local device. In one embodiment, one goal of the notification manager is twofold: (i) reduces, and potentially minimizes, the bandwidth utilization for event distribution, (ii) transforms notifications into high-level method calls meaningful to the registered objects.

Bandwidth minimization preserves the life of the battery of the mobile devices, by reducing the amount of time the radio (or wireless communication) equipment is active. When dealing with notifications, one implementation has different objects in the mobile device registering with remote channels. However, if more than one local object is registered with the same channel, the remote channel sends the information multiple times to the device. Instead, the notification manager receives the notification from the remote channel once, and redistributes the notification locally in the mobile device using local inter-process communication mechanisms, therefore effectively reducing the amount of data received by the device. The second goal of the notification manager, notification transformation, avoids high level objects from having to deal with the raw-data contained in the notification. The notification manager uses an adapter (listener adapter) that transforms the notifications into standard method invocations, and therefore allows existing objects to be registered with the notification manager without any changes in their implementation.

The notification manager receives the notification and forwards it to all listeners registered with the specific channel and running on the handset. There are two types of listeners: listener adapters, and generic listeners. Listener adapters receive the notification and transform it into a method request. Resource managers are registered with a listener adapter, and therefore, upon receiving a notification, the listener adapter invokes the "ResourceAdded" method on the resource manager with three parameters: channel type, channel name, and URL of the resource. Listeners who are not registered with a listener adapter are responsible for processing the original request.

Figure 10:
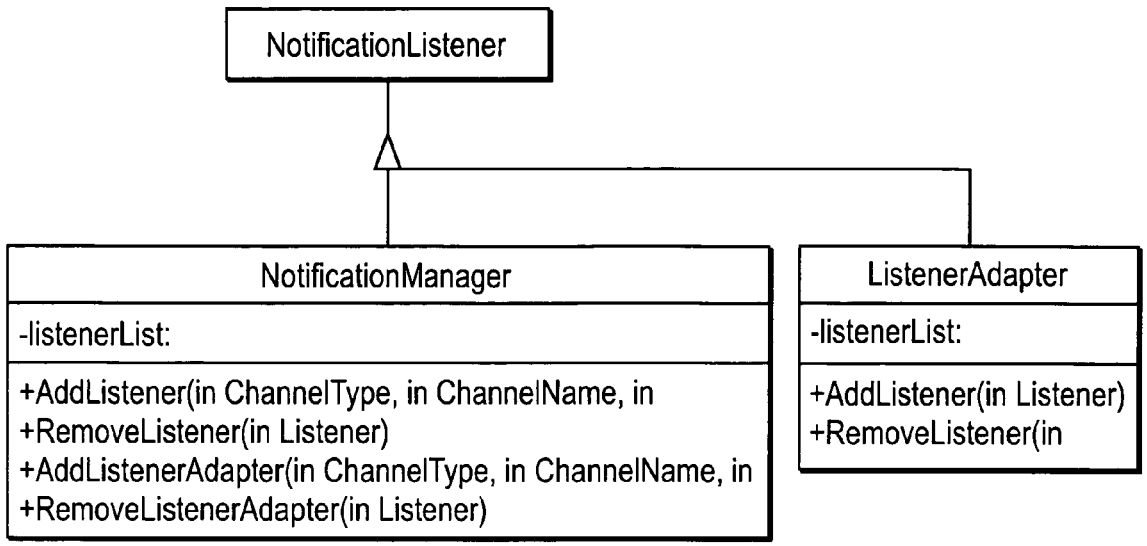
FIG. 10 illustrates a UML class diagram of one embodiment of a notification manager and a listener adapter.

In one embodiment, the notification manager provides an interface to add and remove listeners, add and remove listener adapters, and inherits the "notify" method from the notification listener class. The listener adapter receives a "notify" request and based on the contents of the notification and transforms it into a specific method request. In one embodiment, every listener adapter is assigned to a class of objects, and registers itself with the notification manager. When the notification manager receives a request to add a listener, it obtains the class, looks for an appropriate listener adapter, and registers the listener with it. If no listener adapter is found, the notification manager stores the object in its own list of listeners and invokes the object's notify method when the type and name of the channel matches. For those objects registered with a listener adapter, the listener adapter gets the "notify" invocation, parses the notification and invokes the appropriate method on the registered listeners. FIG. 10 is a block diagram of one embodiment of a notification manager and listener adapter.

The resource manager provides functionality to export local resources to groups, and keeps also global information about resources added by other members to the group. In one embodiment, the resource manager is registered with the notification manager, which invokes the AddResource and RemoveResource as resources are added and removed to and from the group. Maintaining information about the overall group's resources is optional, but it is useful to avoid frequent requests to the group coordinator running at the network side.

The resource manager is responsible for serving resources to remote peers, and delegate such functionality to an object of class ResourceServer. The resource manager can optionally provide synchronization functionality to maintain its local information about the state of the group. Different types of mobile devices and network connections require different synchronization mechanisms; we encapsulate such functionality in an external object that must conform to a synchronization policy interface. Finally, the resource manager can also implement caching mechanisms in coordination with the group coordinator's resource handler. Caching allows the mobile device to push resources to the network size and redirect all incoming traffic to the resource handler, therefore reducing the number of incoming requests. Caching may also be implemented by external objects, which implement a caching policy interface.

Figure 11:
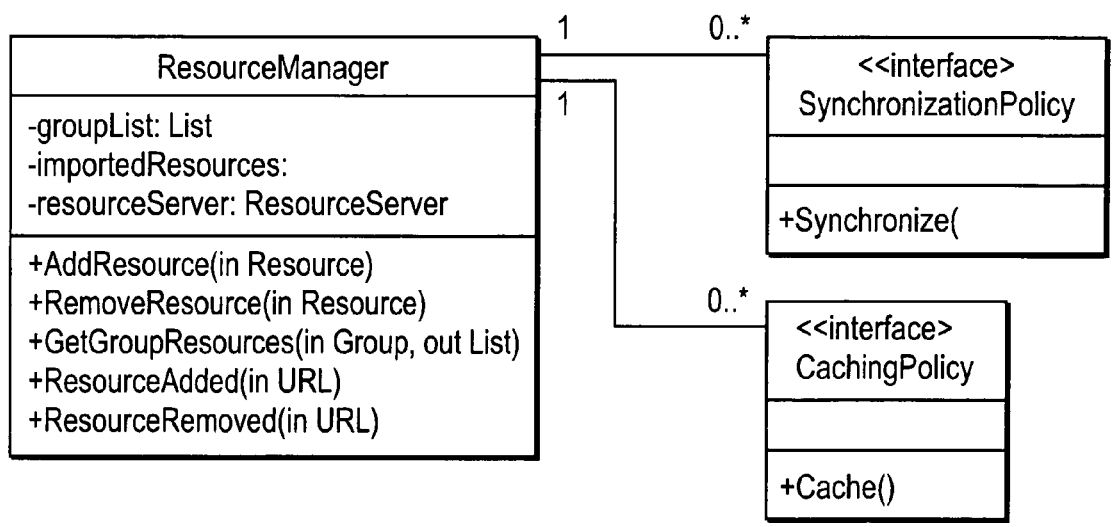
FIG. 11 illustrates a UML class diagram for a resource manager, a synchronization policy, and a caching policy.

A resource is a base class that can be specialized as required by the types of groups and application. Media is defined as a subclass of resource, but envision other types of resources such as services in future instances of the current system. The resource manager can be specialized to address the specific requirements of different types of resources. FIG. 11 illustrates the UML class diagram for the resource manager, a synchronization policy, and a caching policy.

Dynamic UI Binding Manager (DUIBM)

The DUIBM provides functionality to generate a user interface customized for a specific device dynamically. In one embodiment, the DUIBM uses a mechanism similar to JSP custom tags, but instead of embedding the code of the tags with the interface, it obtains the appropriate code dynamically from the DUIBC. In one embodiment, the DUIBM defines two key components: a UI Library Interface and a UI Library Implementation.

A UI Library Interface defines UI rendering or manipulation semantics for a particular UI component (e.g., widgets), such as for example, a component for presenting a list on a device. UI Library Interfaces are collections of related UI Interface Components. A UI Library Interface is defined using a Java Interface that defines the lifecycle callbacks, and an interface specification defining the components and its attributes. The Java interface is exactly like the JSP custom tag interface, and the interface specification is similar to the TLD (Tag Library Specification) used for specifying JSP custom tags, but with no concrete implementation details like class names.

A UI Library Implementation implements a Library Interface. A typical UI Library package contains UI Library Interfaces including the interface specification, implementation of the interface and a capability specification. The library interface definition has the implementation class specified in its TLD file. The Capability Specification lists the capabilities using name-value pairs. The DUIBM interacts with the DUIBC to obtain the appropriate UI Library Implementation, which it caches locally for any further reference.

At the development stage, UI Interface developers agree on a UI library interface and provide these interfaces to application developers and UI Library implementers. Application developers code their User Interface against these interfaces, and UI Library Implementers provide concrete implementations. At the deployment stage, just like the JSP and Custom tags, MSP has to be pre-compiled, potentially, during the deployment stage. However, unlike JSP, the generated code is not bound to a concrete UI Library implementation, but instead, it is bound to a proxy implementation (DUIBC). Finally, at run-time, when the generated interface needs to call a UI component, it calls the DUIBC with the UI library interface name, UI component and the capability of the device. The DUIBC asks the Discovery service in the UI controller to provide an implementation for the specified library interface that is suitable for the device capabilities.

Dynamic On-Device UI Binding

This protocol describes the steps required to generate a UI at the mobile device dynamically. The protocol is illustrated in FIG. 13. When an application running at the handset requires a UI, it sends a request to the Dynamic UI Binding Manager (DUIBM) running at the handset, and provides it with a UI Template, which uses a collection of UI library interfaces. The DUIBM parses the UI template and based on the UI library interfaces, it looks for UI library implementations appropriate for the current device. The DUIBM start looking in its internal cache, and if no matches are found, it contacts the Dynamic UI Binding Coordinator (DUIBC) and provides a description of the properties of the mobile device, and the specific UI library interface. The DUIBC uses the provided parameters to locate the appropriate UI library implementation, and returns it to the DUIBM. With all the UI library implementations, the DUIBM generates the UI and returns it to the application.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A mobile device for use with a network device of a carrier as part of a plurality of mobile devices, the mobile device comprising: a cellular phone; a memory of the cellular phone to store one or more media resources; a resource manager of the cellular phone to control distribution of the one or more media resources stored in the memory by cooperating with a resource coordinator of the network device to dynamically determine whether a media resource or a link to the media resource is to be provided to the resource coordinator to enable distribution of the one or more media resources to a predetermined group of mobile devices in the plurality of mobile devices, and wherein middleware infrastructure control is partitioned between the network device of the carrier and the cellular phone, such that middleware at the cellular phone controls the distribution of the one or more media resources and middleware at the network device coordinates the plurality of mobile devices, wherein the resource manager checks local storage for content and then sends the link to the content to the resource coordinator of the network device and in response to receiving a link the network device checks local storage and if the content is not stored in local storage, sends a request to retrieve the content to a resource manager of another mobile device to obtain the content therefrom and then subsequently forward the retrieved content to the resource manager of the mobile device; and a notification manager to receive notifications from a notification distributor of the network device regarding resources and their availability to the predetermined group of mobile devices and to forward the notifications to either the resource manager or to another internal location for handling.

2. The mobile device defined in claim 1 wherein the resource manager and a resource coordinator of the network device cooperate to dynamically and adaptively handover resources using a protocol that involves the mobile device sending either a link to a resource or the resource to the resource coordinator based on a condition of the mobile device.

3. The mobile device defined in claim 2 wherein the resource manager sends a link to the resource coordinator of the network device and further wherein the resource coordinator stores the link and causes the link to be sent to a group of members of the plurality of mobile devices.

4. The mobile device defined in claim 3 wherein the plurality of mobile devices are a subset of mobile devices communicating with a network.

5. The mobile device defined in claim 2 wherein the resource manager sends the media resource to the network device, and further wherein the resource coordinator stores the media resource and causes a link to the media resource to be sent to the plurality of mobile devices, wherein the link identifies a location to the media resource in a memory accessible by the network device.

6. The mobile device defined in claim 2 wherein the resource manager sends a link to content storage on the mobile device to the resource coordinator, wherein in response thereto the resource coordinator retrieves the content from the mobile device and stores the content locally, wherein the resource coordinator causes the content to be sent to the plurality of mobile devices.

7. The mobile device defined in claim 6 wherein the resource manager sends the content to the resource coordinator that stores the content locally and causes a notification coordinator to send the content to the plurality of mobile devices.

8. The mobile device defined in claim 7 wherein the resource manager checks local storage for content and, if it is not in local storage, sends a request to the resource coordinator of the network device, which retrieves the resource and forwards it to the resource manager of the mobile device hosting the resource.

9. The mobile device defined in claim 8 wherein the resource manager stores the content locally in response to receiving the content.

10. The mobile device defined in claim 1 wherein the resource coordinator of the network device and the resource manager of the mobile device store a copy of the content in local storage.

11. The mobile device defined in claim 1 wherein the resource manager utilizes an adaptive resource distribution protocol that includes posting links or content and distributing links or content in which the decision to post the link or content and distribute a link or content is based on criteria.

12. The mobile device defined in claim 11 wherein modification of the distribution protocol is based on resource popularity.

13. The mobile device defined in claim 11 wherein modification of the distribution protocol is based on bandwidth consumption.

14. The mobile device defined in claim 1 further comprising a browser to interact with the resource manager to add resources and retrieve resources.

15. The mobile device defined in claim 1 further comprising a notification manager.

16. A method comprising: a mobile device storing one or more media resources, the mobile device comprising a cellular phone having a memory; the mobile device controlling distribution of the one or more media resources stored in the memory by cooperating with a resource coordinator of a network device to dynamically determine whether a media resource or a link to the media resource is to be provided to the resource coordinator to enable distribution of the one or more media resources to a predetermined group of mobile devices in a plurality of mobile devices in a network, wherein dynamically determining comprises determining whether a bandwidth consumption condition, a low battery condition or a storage quotient condition is reached, and wherein middleware infrastructure control is partitioned between the network device and the mobile device, such that middleware at the mobile device controls the distribution of the one or more media resources and middleware at the network device coordinates the plurality of mobile devices; and receiving, with a notification manager in the mobile device, notifications from a notification distributor of the network device regarding resources and their availability to the predetermined group of mobile devices and forwarding the notifications to either the resource manager or to another internal location in the mobile device for handling, and wherein the method further comprising: the resource manager checking local storage for content and then sending the link to the content to the resource coordinator of the network device; and in response to receiving the link, the network device checking local storage, and if the content is not stored in local storage, sending a request to retrieve the content to a resource manager of another mobile device to obtain the content therefrom and then subsequently forwarding the retrieved content to the resource manager of the mobile device.

17. The method defined in claim 16 further comprising dynamically and adaptively handing over resources using a protocol that involves the mobile device sending either a link to a resource or the resource to the resource coordinator based on a condition of the mobile device.

18. The method defined in claim 17 further comprising:
sending a link to the resource coordinator of the network device and further wherein the resource coordinator stores the link; and
causing the link to be sent to a group of members of the plurality of mobile devices.

19. The method defined in claim 18 wherein the plurality of mobile devices are a subset of mobile devices communicating with a network.

20. The mobile device defined in claim 17 further comprising:
sending the media resource to the network device; and
the network device storing the media resource and causing a link to the media resource to be sent to the plurality of mobile devices, wherein the link identifies a location for the media resource in a memory accessible by the network device.

21. The mobile device defined in claim 17 further comprising:
sending a link to content storage on the mobile device to the resource coordinator of the network device;
in response thereto, the resource coordinator of the network device
retrieving the content from the mobile device;
storing the content locally; and
causing the content to be sent to the other mobile devices.

22. The method defined in claim 21 further comprising
sending the content to the resource coordinator that stores the content locally; and
causing a notification coordinator of the network device to send the content to the other mobile devices.

23. The method defined in claim 22 further comprising:
a resource manager of the network device checking local storage for content;
if it is not in local storage, the resource manager sending a request to the resource coordinator of the network device for retrieving the resource; and
forwarding the request to the resource manager of the mobile device hosting the resource.

24. The method defined in claim 23 further comprising the resource manager storing the content locally in response to receiving the content.

25. The method defined in claim 16 further comprising the resource coordinator of the network device and the resource manager of the mobile device storing a copy of the content in local storage.

26. The method defined in claim 16 further comprising the resource manager utilizing an adaptive resource distribution protocol that includes posting links or content and distributing links or content in which the decision to post the link or content and distribute a link or content is based on criteria.

27. The method defined in claim 26 wherein modification of the distribution protocol is based on resource popularity.

28. The method defined in claim 26 wherein modification of the distribution protocol is based on bandwidth consumption.

29. A system comprising: a plurality of mobile handset devices comprising cellular phones; a network device comprising a cellular phone carrier server communicably coupled to the plurality of mobile handset devices, the network device having a group coordinator to coordinate the plurality of mobile handset devices, a resource coordinator to obtain media resources for the plurality of mobile handset devices, and a notification coordinator to notify mobile handset devices in the plurality of mobile handset devices of a media resource that is available; wherein each of the plurality of mobile handset devices generates and hosts one or more audio, video or picture media resources and cooperates with the network device to dynamically determine whether to individual mobile handset devices handover resources when the individual mobile handset device is in a condition, wherein each of the plurality of mobile handset devices keeps track of resources added to the mobile handset device by other mobile handset devices, and coordinates distribution to the other mobile handset devices of media resources hosted on the mobile handset device, and wherein middleware infrastructure control is partitioned between the network device and a mobile handset device, such that middleware at the mobile handset device controls the distribution of the one or more media resources and middleware at the network device coordinates the plurality of mobile devices, and wherein the resource manager checks local storage for content and then sends the link to the content to the resource coordinator of the carrier; in response to receiving a link the carrier checks local storage and if the content is not stored in local storage, sends a request to retrieve the content to a resource manager of another mobile handset device to obtain the content therefrom and then subsequently forward the retrieved content to the resource manager of the mobile handset device.

30. The system defined in claim 29 wherein the resource manager of the individual mobile handset device and the resource coordinator of the network device cooperate to dynamically and adaptively handover resources using a protocol that involves the mobile handset device sending either a link to a resource or the resource to the resource coordinator based on the condition of the mobile handset device.

31. The system defined in claim 30 wherein the condition is one selected from a group consisting of excessive bandwidth consumption condition, a low battery power condition, and a storage quota condition.

32. The system defined in claim 29 wherein the resource manager sends a link to the resource coordinator of the network device and further wherein the resource coordinator stores the link and causes the notification coordinator to send the link to a group of members of the plurality of mobile handset devices.

33. The system defined in claim 29 wherein the plurality of mobile handset devices are a subset of mobile handset devices communicating with a network.

34. The system defined in claim 29 wherein the resource manager sends the media resource to the network device, and further wherein the resource coordinator stores the media resource and causes the notification coordinator to send a link to the media resource to other mobile handset devices, wherein the link identifies the media resource in a memory accessible to the network device.

35. The system defined in claim 34 wherein the resource manager sends a link to content storage on the mobile handset device to the resource coordinator, wherein the response thereto the resource coordinator retrieves the content from the individual mobile handset device and stores the content locally, wherein the resource coordinator causes the notification coordinator to send the content to other mobile handset devices.

36. The system defined in claim 35 wherein the resource manager sends the content to the resource coordinator that stores the content locally and causes the notification coordinator to send the content to the plurality of mobile handset devices.

37. The system defined in claim 36 wherein the resource manager of an individual mobile handset device checks local storage for content and, if it is not in local storage, sends a request to the resource coordinator of the carrier, which retrieves the resource and forwards it to the resource manager of the individual mobile handset device.

38. The system defined in claim 37 wherein the resource manager stores the content locally in response to receiving the content.

39. The system defined in claim 29 wherein the resource coordinator of the carrier and the resource manager of the mobile handset device store a copy of the content in local storage.

40. The system defined in claim 29 wherein the resource coordinator utilizes an adaptive resource distribution protocol that includes posting links or content and distributing links or content in which the decision to post the link or content and distribute a link or content is based on criteria.

41. The system defined in claim 40 wherein the criteria comprises resource popularity.

42. The system defined in claim 40 wherein modification of the distribution protocol is based on bandwidth consumption.

43. A cellular phone carrier comprising: a group coordinator; a resource coordinator to obtain media for a plurality of mobile cellular phone devices, wherein obtaining media comprises obtaining audio, video, or pictures generated, stored, and distributed by ones of the mobile cellular phone devices, as a resource, to be accessed by the others of the mobile cellular phone devices; and a notification distributor to notify mobile cellular phone devices in the plurality of mobile cellular phone devices of a media resource that has been received, wherein the resources coordinator and the notification distributor cooperate with the plurality of mobile cellular phone devices to dynamically and adaptively provide access to resources using a protocol that involves a mobile cellular phone device sending either a link to a resource or the resource to the resource coordinator based on a condition of the mobile cellular phone device, and wherein middleware infrastructure control is partitioned between the cellular phone carrier and the mobile cellular phone device, such that middleware at the mobile cellular phone device controls the distribution of the one or more media resources and middleware at the cellular phone carrier coordinates the plurality of mobile devices, wherein a first resource manager of a cellular phone controls distribution of the one or more media resources by cooperating with the resource coordinator, and further wherein the resource manager checks local storage for content and then sends the link to the content to the resource coordinator of the network device and in response to receiving a link the network device checks local storage and if the content is not stored in local storage, sends a request to retrieve the content to a resource manager of another mobile device to obtain the content therefrom and then subsequently forward the retrieved content to the resource manager of the mobile device.

44. The mobile device defined in claim 1, wherein the resource manager serves resources to other cellular phones, keeps track of resources added to the mobile device by other members of the predetermined group, coordinates resource distribution and management for the group, and services requests of a browser of the mobile device.

45. The method of claim 16, wherein the media resource or the link to the media resource to be provided to the resource coordinator is kept in a cellular telephone handset instead of being transferred to a network device, and is shared with other cellular phone handsets from the cellular phone handset.

46. The mobile device defined in claim 1, wherein the resource manager directly shares the media resources from a memory of the mobile device, through the resource coordinator, and to a plurality of mobile devices of the predetermined group of mobile devices.

47. The mobile device defined in claim 46, wherein the plurality of mobile devices includes the mobile device; and wherein the media resources comprise personal content including audio, video, or pictures generated by the mobile device.

48. The mobile device defined in claim 46, wherein distribution is controlled by the mobile device to partition middleware infrastructure between a mobile device carrier network of the mobile device and the mobile device.

\* \* \* \* \*